United States Patent [19]

Yatka et al.

[11] Patent Number: 5,397,579
[45] Date of Patent: Mar. 14, 1995

[54] ENVIRONMENTALLY STABLE CHEWING GUM COMPOSITIONS CONTAINING ERYTHRITOL

[75] Inventors: Robert J. Yatka, Orland Park; Henry T. Tyrpin, Midlothian; Gordon N. McGrew, Evanston, all of Ill.

[73] Assignee: Wm. Wrigley Jr. Company, Chicago, Ill.

[21] Appl. No.: 175,860

[22] Filed: Dec. 30, 1993

Related U.S. Application Data

[63] Continuation-in-part of PCT/US93/09354, Sep. 30, 1993

[51] Int. Cl.$^6$ .................................. A23G 3/30
[52] U.S. Cl. .......................... 426/3; 426/804
[58] Field of Search ........................ 426/3–6, 426/548, 804

[56] References Cited

U.S. PATENT DOCUMENTS

| | | |
|---|---|---|
| 3,899,593 | 8/1975 | Hammond et al. |
| 4,000,320 | 12/1976 | Klose et al. ............... 426/3 |
| 4,065,578 | 12/1977 | Reggio et al. |
| 4,382,963 | 5/1983 | Klose et al. |
| 4,902,525 | 2/1990 | Kondou |
| 4,931,294 | 6/1990 | Yatka et al. |
| 4,933,188 | 6/1990 | Cherukuri et al. |
| 5,080,916 | 1/1992 | Kondou |
| 5,120,550 | 6/1992 | Van der Schueren |
| 5,156,866 | 10/1992 | Sato et al. |

FOREIGN PATENT DOCUMENTS

| | | |
|---|---|---|
| 0009325A | 4/1980 | European Pat. Off. |
| 0325790A | 8/1989 | European Pat. Off. |
| 0497439A | 8/1992 | European Pat. Off. |
| 0511761A | 11/1992 | European Pat. Off. |
| 0530995A | 3/1993 | European Pat. Off. |
| 56-18180 | 4/1981 | Japan |
| 1-51045 | 2/1989 | Japan |
| 1-225458 | 9/1989 | Japan |
| 2-104259 | 4/1990 | Japan |
| 4-287658 | 10/1992 | Japan |
| 4-287659 | 10/1992 | Japan |
| 5-137535 | 6/1993 | Japan |
| WO93/00828 | 1/1993 | WIPO |

*Primary Examiner*—Jeanette Hunter
*Attorney, Agent, or Firm*—Steven P. Shurtz

[57] ABSTRACT

Chewing gum containing gum base, erythritol and flavor, but which is free of added water and hygroscopic ingredients, is environmentally stable, i.e., does not absorb significant amounts of water from the atmosphere to soften with age, or give off significant amounts of water to the atmosphere to harden or stiffen with age.

16 Claims, 2 Drawing Sheets

ENVIRONMENTALLY STABLE CHEWING GUM COMPOSITIONS CONTAINING ERYTHRITOL

CROSS-REFERENCE TO RELATED APPLICATION

This application is a continuation-in-part of PCT Application Ser. No. PCT/US93/09354, filed Sep. 30, 1993, designating the United States, which is hereby incorporated by reference.

BACKGROUND OF THE INVENTION

This invention relates to chewing gum. More particularly, it relates to a chewing gum which contains gum base, erythritol and flavor, but is free of added moisture and hygroscopic ingredients; and which is environmentally stable, i.e., which does not absorb significant amounts of water from the atmosphere to soften with age, or give off significant amounts of water to the atmosphere to harden or stiffen with age.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers. The non-sugar polyols have the advantage of not contributing to dental caries of consumers, as well as being able to be consumed by diabetics.

One problem with many sugar alcohols is that they are hygroscopic, and chewing gums using them absorb moisture in high humidity environments unless special precautions are taken. Finding a non-cariogenic sweetener that will still provide a gum with good shelf stability would be an improvement. Also many polyols cause gastric distress when consumed in too great of quantities. Therefore it would be desirable to use a non-cariogenic sweetener that did not cause gastric distress.

U.S. Pat. No. 5,120,550 discloses a chewing gum made with a sweetening agent containing erythritol and a liquid sugar alcohol.

EPO Patent Publication No. 0 009 325 and Japanese Patent Publication No. 81-18180 disclose a method of reducing dental caries with a sugarless chewing gum made with erythritol.

Low calorie sweetening compositions containing meso-erythritol are disclosed in U.S. Pat. Nos. 5,080,916 and 4,902,525, EPO Patent Publication No. 0 325 790, and Japanese Patent Publications No. 89-225458 and No. 90-104259.

Japanese Patent No. 89-51045 discloses chewing gum made with a melted mixture of meso-erythritol and sugars or sugar alcohols.

EPO Patent Publication No. 0 497 439 discloses a sweetener employing the use of spray dried erythritol.

EPO Patent Publication No. 0 511 761 discloses a sweetening composition made up of erythritol, sorbitol, and a glucose oligomer.

PCT Publication No. W093/00828 discloses a stabilized dipeptide sweetening composition which is useful in chewing gum and may contain erythritol.

Other patents and publications which discuss erythritol include Japanese Patent Publications No. 92-287658 and No. 92-287659, both published Oct. 13, 1992, (sweetening compositions containing meso-erythritol); and European Patent Publication No. 0 530 995, published Mar. 10, 1993, (lozenge containing sweetener which is all or partly erythritol or maltitol).

U.S. Pat. No. 4,931,294 discloses an environmentally stable chewing gum composition containing xylitol, gum base and flavor, but no added water or hygroscopic ingredients.

Erythritol does not contribute to dental caries, does not significantly contribute to calories and does not cause gastric distress like some other polyols. Thus, this ingredient's use in chewing gum could be a definite improvement. Also, it has been discovered that chewing gum compositions with erythritol are environmentally stable.

SUMMARY OF THE INVENTION

The gum compositions of the present invention contain gum base and erythritol as their major components, along with flavor as a minor component, and are made without any added liquids, moisture, hydrophilic binders or other hydrophilic ingredients. The resulting product is simpler to manufacture than gums containing more ingredients, and is very texture stable in extreme environmental conditions (up to 80% relative humidity) over an extended shelf life.

According to the present invention, there is provided a chewing gum composition which does not significantly gain or lose moisture when exposed to high or low humidity conditions, consisting essentially of (a) from about 5% to about 95%, preferably from about 10% to about 50%, and more preferably from about 20% to about 30%, by weight of the gum, of gum base;

(b) from about 4.9% to about 94.9%, preferably from about 47% to about 89.5%, and more preferably from about 67% to about 79.5%, by weight of the gum, of erythritol; and (c) from about 0.1% to about 10%, by weight of the gum, preferably from about 0.5% to about 3.0%, of flavor;

(d) the gum composition containing less than 0.25% of water and ingredients which have an equilibrium moisture content of more than about 7% at 20° C. and a relative humidity of 78%.

The phrase "consisting essentially of" is used with respect to this invention in its ordinary sense, i.e., as allowing the presence of unspecified ingredients which do not materially affect the basic and novel characteristics of the invention. In the case of this invention, however, it is to be noted that added water, glycerin, hydrophilic binders or other hydrophilic ingredients, outside of the claimed limits, materially affects the basic and novel characteristics of the invention; although inclusion of other optional ingredients such as xylitol, dextrose, sucrose, colors (not dispersed in glycerin), emulsifiers, pharmaceutical agents, fillers, high intensity sweeteners such as encapsulated aspartame, flavor enhancers, softeners, food acids, lecithin, and mannitol, in general do not.

"High Humidity Conditions" as used herein refers to humidity of about 80% relative humidity.

DETAILED DESCRIPTION OF THE INVENTION AND PREFERRED EMBODIMENTS

Figure 1:
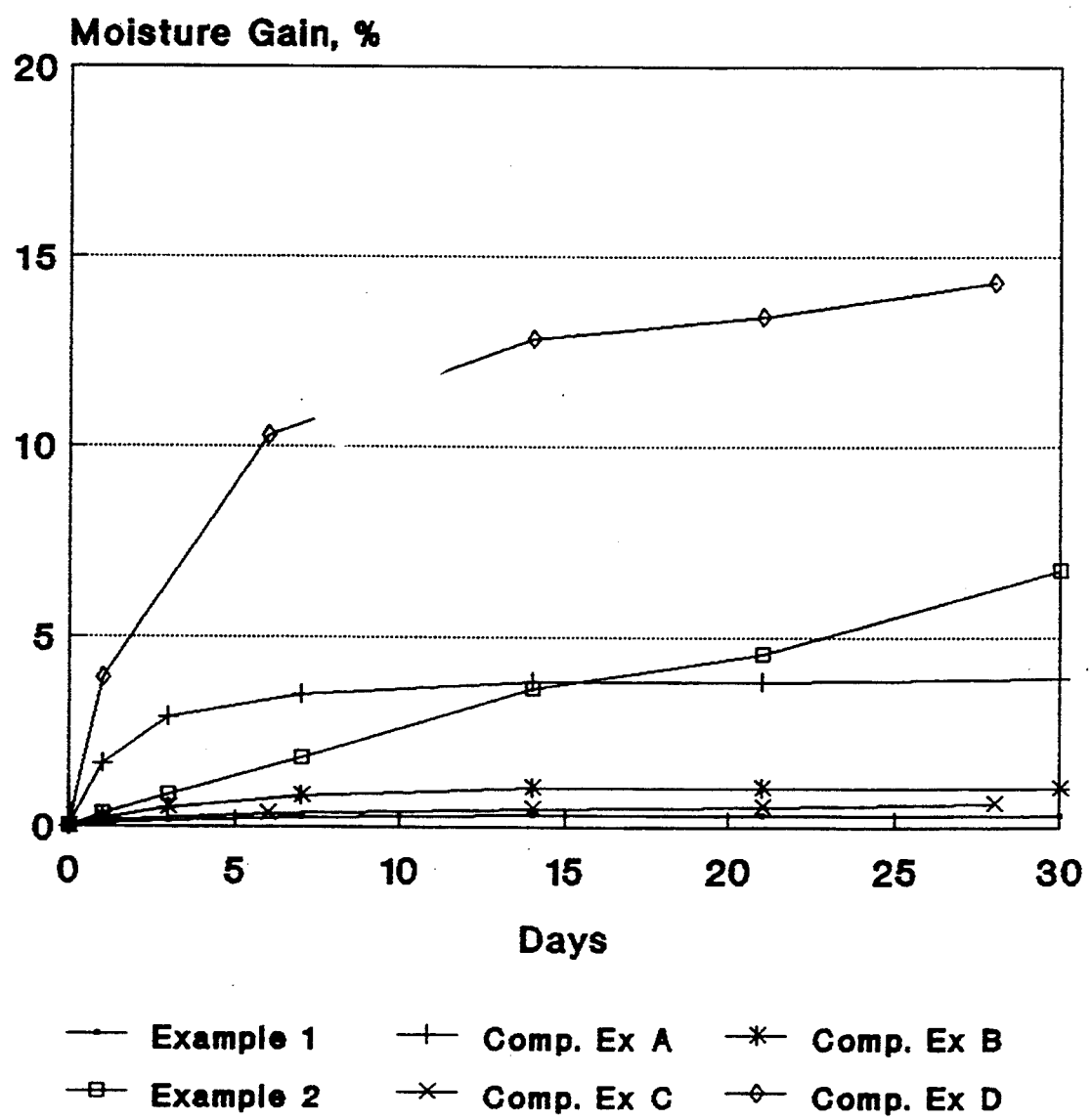
FIG. 1 is a graph showing the moisture gain of gum using erythritol and some comparative gum compositions stored at 79% RH.

All percentages herein are weight percentages unless otherwise specified. The term "chewing gum" also includes bubble gum and the like.

The gum compositions of the present invention contain gum base and erythritol as their major components, along with flavor as a minor component.

Erythritol is a tetrahydic polyol or sugar alcohol, having the empirical formula $C_4H_{10}O_4$ and the structural formula $CH_2COH—CHOH—CHOH—CH_2OH$. It can be obtained by fermenting glucose with specially selected yeast strains in appropriate aqueous nutrient media, or by treating an aqueous alkali carbonate solution of 2-buten-1,4-diol with chlorine, and saponifying the resulting chlorohydrin. Erythritol is available from Mitsubishi Kasei America, Inc., 81 Main Street, White Plains, N.Y. 10601; and from Mitsubishi Kasei Corp., outside the United States, as a powder with a melting point of about 119° C. It has a sweetness level of about 75% of that of sucrose, and has good storage stability. Erythritol is not approved for use in human food products or chewing gum in the United States. A GRAS affirmation petition for erythritol as a human food ingredient is being prepared by Mitsubishi Kasei Corp. Erythritol does not contribute to dental caries, does not cause gastric distress, and does not contribute significantly to caloric intake, giving a highly acceptable chewing gum product. Erythritol has been found to be less hygroscopic than xylitol, which is a bulking agent known to provide gum with good stability.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The chewing gum compositions of the present invention follow the general pattern outlined above. They are made with erythritol as the main ingredient in the bulk portion, but without any added moisture. The most important aspect of the compositions of the present invention is the omission of any added water and ingredients which are more hygroscopic than xylitol at relative humidities less than 80%. This renders the product environmentally stable by virtue of the fact that it will resist softening and stiffening with age due to moisture gain or loss, respectively, or due to crystalline changes. It is believed that texture stability is increased by slowing crystalline changes.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between 10% and 50% of the gum and most preferably about 20% to about 30% of the gum. The present invention contemplates employing any commercially acceptable gum base which requires no aqueous or hygroscopic softeners to provide a soft texture and whose film-forming characteristics will bind the composition together. The best texture is achieved with soft bases, i.e., bases with softening points of about 50°-65° C. Often, a bubble gum base constitutes a portion of the gum base, which improves the film forming characteristics and binding ability of the base.

As noted above, the gum base is essentially free of water, i.e., it contains no specifically added water, but only trace amounts of water which are inherent in the ingredients of the gum base. Typically the gum base will contain on the order of 0.1 or 0.2 percent water, which is very difficult to remove.

The second essential component of the gum composition of the invention, of which the water-soluble bulk portion is comprised, is erythritol. Erythritol constitutes from about 4.9 to about 94.9 percent, preferably from about 47 to about 89.5 percent, and more preferably from about 67 to about 79.5 percent, by weight of the gum.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors (not dispersed in glycerin), emulsifiers and pharmaceutical agents may also be added as separate components of the chewing gum composition, if not added as part of the gum base. Other ingredients which may optionally be added include dextrose and sucrose sugars, free and/or encapsulated aspartame as a sugarless sweetening agent, lecithin as an emulsifier and a softening agent, other softening agents, flavor enhancers, food acids and mannitol.

Mannitol, a hexahydric sugar alcohol, is preferably added as a supplemental bulking and sweetening agent. Although it is less sweet than erythritol, its hygroscopicity (below 80% humidity) is similar to erythritol, and it has less solubility in water than erythritol. As a result of its lower solubility, it remains in the gum longer, lengthening the time that sweetness and flavor are observed.

Mannitol can be added directly to the mix, or used as a rolling compound, i.e., a non-hygroscopic material added in powdered form to the surface of sticks of gum to prevent the sticks of gum from sticking to machinery, wrapping papers, and the like.

Other conventional gum ingredients may also be included. In selecting ingredients for the chewing gum compositions, however, it is to be remembered that the chewing gum compositions are made without any added water or ingredients which are more hygroscopic than xylitol, hydrophilic binders or other hydrophilic ingredients. Encapsulated aspartame is a high intensity sweetener with improved stability and release characteristics, as compared to free aspartame. Free aspartame can also be added, and a combination of some free and encapsulated aspartame is preferred.

The use of aqueous syrups (such as corn syrup and hydrogenated corn syrup) should be avoided, because if such syrups are included in the gum, and if the gum is subjected to a drop in humidity present in the surrounding atmosphere, crystals of the carbohydrates present in the gum can undesirably crystallize and grow, resulting in a loss of flexibility of the gum. Likewise, aqueous sweeteners and other aqueous ingredients are to be avoided, as are glycerin, fructose and sorbitol.

As noted above, the gum composition of the invention should contain less than 0.25% of water and ingredients which have an equilibrium moisture content of more than about 7% at 20° C. and a relative humidity of 78%. An alternative statement is that the gum composition of the invention should contain less than 0.25% of water and ingredients which are more hygroscopic than xylitol.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color may also be added at this time. The erythritol bulking agent may then be added in portions to the mixer. Flavor is typically added with the final portion of the erythritol bulking agent. Other optional ingredients are added in the batch in a typical fashion, well known to those of ordinary skill in the art. It is conventional to cool the gum prior to wrapping, so as to make the gum more manageable.

There are two common ways of expressing the tendency of a material to hold moisture or pick it up from the atmosphere, namely equilibrium moisture content and equilibrium relative humidity. The hygroscopicity of materials is best expressed as their equilibrium moisture content, which varies with the relative humidity of the atmosphere surrounding the material under consideration. The equilibrium moisture content of erythritol increases gradually up to about 90% relative humidity; at 85% relative humidity and 20° C. it is 0.1%. Above 90% relative humidity, however, the equilibrium moisture content of erythritol increases dramatically. At 93% relative humidity and 20° C. the equilibrium moisture content of erythritol is about 2%. By way of comparison, at 80% relative humidity and 25° C., the equilibrium moisture content of glycerin is 49%. The equilibrium moisture contents of fructose, sorbitol, dextrose and sucrose at 78% relative humidity and 20° C. are 45%, 33%, 5% and 3%, respectively. At 77% relative humidity and 26.7° C., the equilibrium moisture contents of dextrose, sucrose and mannitol are 0.6%, 0.3% and 0.2%, respectively. At 78% relative humidity and 20° C., the equilibrium moisture content of xylitol is 7%.

The measurement of equilibrium relative humidity is a technique used to identify the tendency of a composition to lose or gain water at a given relative humidity. ERH is measured by storing sticks of the gum in various relative humidity conditions and measuring their loss or gain of weight after a sufficient time. The weight change is attributed to loss or gain of water. The ERH value of a gum composition is the relative humidity at which the gum will neither gain nor lose water. For example, an ERH of 50% means that a gum with such an ERH which is stored in a relative humidity of 50% remains stable, neither gaining nor losing moisture. A gum having an ERH close to the ambient relative humidity will presumably have a longer shelf life than a gum which has an ERH which is either lower or higher than the ambient relative humidity. Typical sugar-containing gums will have an ERH on the order of 40 to 50%, while so-called "anhydrous" gums may have an ERH of 15 to 25%. Gum with a very low ERH will pick up water and soften, and may as a result undergo undesirable changes such as recrystallization. Gum which has an ERH higher than the ambient relative humidity will harden and become tough and crumbly upon loss of water.

ERH is an indication of whether or not a gum will gain or lose water in a particular environment, but is not in itself an indication of how fast a gum will gain or lose water (i.e., the rate at which the water content of the gum will change). In general, the more glycerin or other hygroscopic ingredients there are in a gum, the lower will be its ERH, and the more quickly the gum will absorb water at relative humidities above the ERH for the gum. On the other hand the more water there is in a gum, the higher will be its ERH, and the more quickly the gum will lose water at relative humidities below the ERH for the gum. The effects of hygroscopic ingredients and water content on ERH may be balanced by increasing both hygroscopic ingredients and water, but their effects on rate of change of water content are not balanced. Increasing both hygroscopic ingredients and water content in gums in the proper proportions may not change the ERH of the gum, but it will increase the tendencies of the gum both to gain and to lose water at relative humidities above and below the ERH for the gum, respectively.

Paloja chewing gum base used in the following Examples is commercially available from the L.A. Dreyfus Company in Plainfield, N.J. The "glycerin" used in the Examples was actually 99% glycerin and 1% water, which naturally is present in glycerin exposed to the atmosphere, owing to its hygroscopic nature of glycerin. Glycerin containing up to 4% water is frequently used in chewing gums, and even when containing 4% water, it is highly hygroscopic.

Chewing gum was made with erythritol, gum base and flavor. For comparison purposes, other gum samples were made containing glycerin and water. Another sample was made substituting part of the erythritol with xylitol. For comparison purposes, other samples were made substituting the remainder of the erythritol with xylitol and adding glycerin. The formulas of the samples are in Table 1 below.

TABLE 1

(in weight percent)

|  | Ex. 1 | Comparative Ex. A | Comparative Ex. B | Ex. 2 | Comparative Ex. C | Comparative Ex. D |
|---|---|---|---|---|---|---|
| Paloja Gum Base | 30.0 | 30.0 | 30.0 | 30.0 | 30.0 | 30.0 |
| Xylitol | — | — | — | 34.35 | 68.7 | 64.7 |
| Erythritol | 68.7 | 64.7 | 64.7 | 34.35 | — | — |
| Glycerin | — | 4.0 | 2.0 | — | — | 4.0 |
| Water | — | — | 2.0 | — | — | — |
| Flavor | 1.3 | 1.3 | 1.3 | 1.3 | 1.3 | 1.3 |

Figure 2:
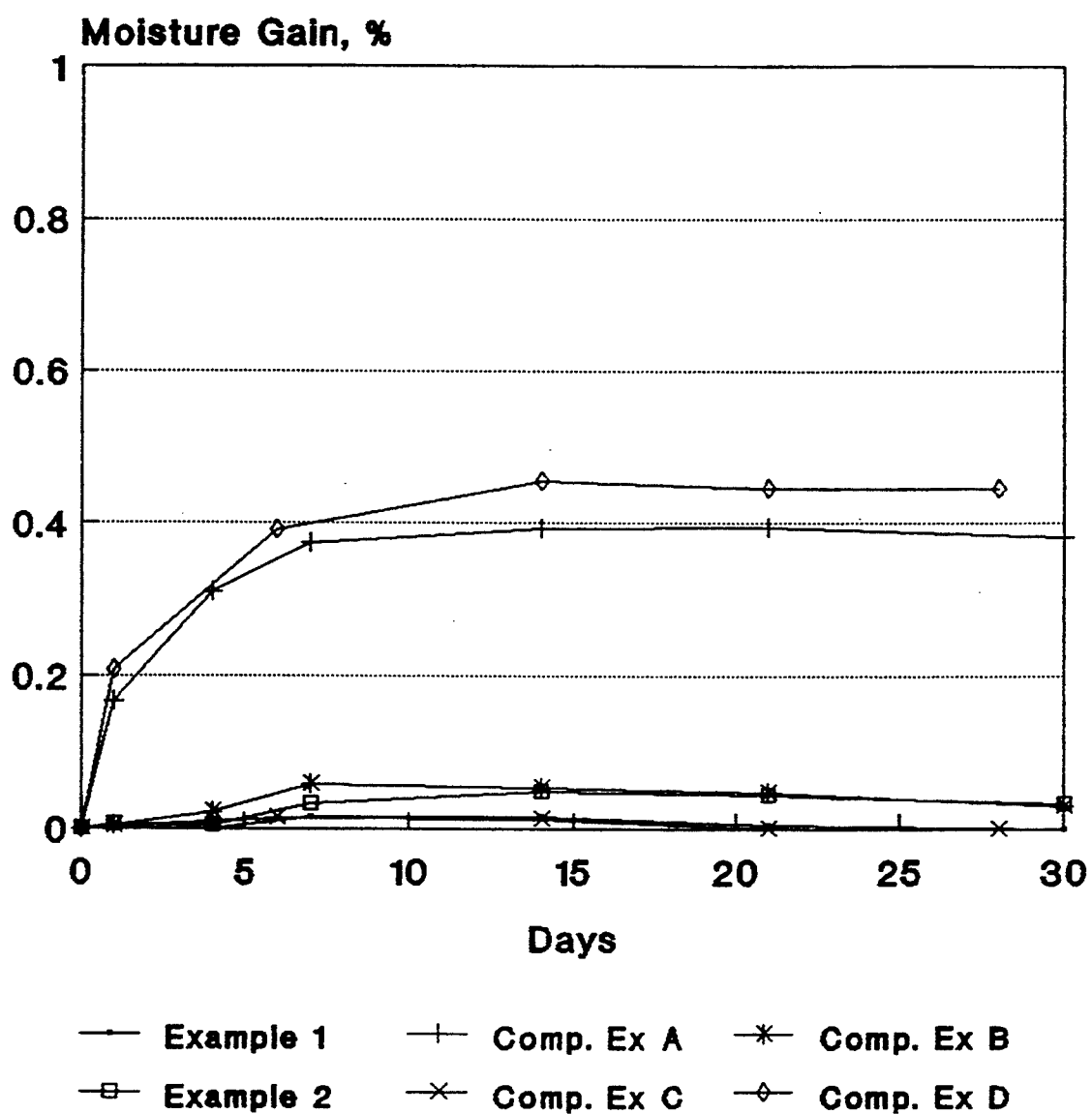
FIG. 2 is a graph showing the moisture gain of the same gum samples stored at 33% RH.

The gums were sheeted and subjected to moisture gain/loss studies. The chewing gum samples were placed in desiccators at 79% RH, 74° F. and 33% RH, 74° F. These gum samples were then tested at 0, 1, 3, 6 or 7, 14, 21 and 28 or 30 days. The results of the moisture gain studies can be seen for 79% RH in FIG. 1 and for 33% RH in FIG. 2.

The only difference between the gum samples of Example 1 and comparative Example C was the polyol used, erythritol vs. xylitol. Xylitol gum was used as a control in this instance because it is known that xylitol chewing gum is environmentally stable, as disclosed in U.S. Pat. No. 4,931,294, which is hereby incorporated by reference. As shown in the figures, erythritol gum was even more stable than xylitol gum at 79% RH, and of comparable stability at 33% RH. Based on the known stability of the xylitol gums, it can thus be seen that erythritol gum according to the invention formula is also much more stable than conventional chewing gum.

A comparison of the weight gain for gum samples without glycerin and gum samples with glycerin (Example 1 vs. comparative Example A and comparative Example C vs. comparative Example D) shows how the presence of glycerin in the gum, with either erythritol or xylitol, causes much more moisture gain in the samples. While comparative Example B did not have much moisture gain, it was formulated with 2% water to begin with. The initial texture of comparative Example B was unsuitable for processing.

The combination of erythritol and xylitol in Example 2 gave an unexpected result in that it was more hygroscopic than gum samples containing either of the two polyols alone. However, this does not appear to be a typical moisture gain curve, and it may be a result of chemical changes taking place during moisture sorption or a synergistic effect. This synergistic effect may be one of many other synergistic effects such as sweetness, coolness, non-cariogenicity, and other physical properties when erythritol and xylitol are combined in a gum formula. Even though the gum of Example 2 picked up more moisture than the gum of Example 1, other tests showed that it had an acceptable initial texture, and that the texture was still acceptable even after storage at 33% relative humidity.

The ratio of erythritol to xylitol may also vary for different synergistic effects. For gums containing erythritol and xylitol, the ratio of the erythritol and xylitol will generally be between 1:9 and 9:1, more preferably between 1:3 and 3:1, and most preferably about 1:1.

Gums that contain a mixture of erythritol and xylitol have an advantage in that they do not need to contain glycerin or any other binding agent, such as sorbitol solution. Since erythritol is less expensive than xylitol, such a composition would cost less than a gum containing only xylitol. Also, compared to sugarless gums that typically contain mannitol, such a composition could be more easily manufactured because the formula would require fewer ingredients. The omission of glycerin and mannitol would further reduce the cost of the composition.

Two other examples of the present invention can also be made as follows:

|  | Example 3 | Example 4 |
|---|---|---|
| GUM BASE | 29.2% | 30.5% |
| ERYTHRITOL | 69.8% | 68.0% |
| FLAVOR | 1.0% | 1.5% |

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum composition which does not significantly gain or lose moisture when exposed to high or low humidity conditions, consisting essentially of:
    a) from about 5% to about 95%, by weight of the gum, of gum base;
    b) from about 4.9% to about 94.9% by weight of the gum, of erythritol; and
    c) from about 0.1% to about 10%, by weight of the gum, of flavor;
    d) the gum composition containing less than 0.25% of water and ingredients which have an equilibrium moisture content of more than about 7% at 20° C. and a relative humidity of 78%.

2. The chewing gum composition of claim 1, comprising from about 10% to about 50%, by weight of the gum, of gum base.

3. The chewing gum composition of claim 1, comprising from about 20% to about 30%, by weight of the gum, of gum base.

4. The chewing gum composition of claim 2, comprising from about 47% to about 89.5%, by weight of the gum, of erythritol.

5. The chewing gum composition of claim 3, comprising from about 67% to about 79.5%, by weight of the gum, of erythritol.

6. The chewing gum composition of claim 5, comprising from about 0.5% to about 3.0% by weight of the gum, of flavor.

7. The chewing gum composition of claim 1, further comprising at least one member selected from the group consisting of dextrose, sucrose, colors, emulsifiers, pharmaceutical agents, fillers, high intensity sweeteners, flavor enhancers, softeners, food acids, xylitol and mannitol.

8. The chewing gum composition of claim 7, comprising encapsulated aspartame as a high intensity sweetener.

9. The chewing gum composition of claim 7, comprising lecithin as an emulsifier and a softening agent.

10. The chewing gum composition of claim 1, wherein the erythritol is powdered erythritol.

11. A chewing gum composition which does not significantly gain or lose moisture when exposed to high or low humidity conditions, consisting essentially of:
    a) from about 5% to about 95%, by weight of the gum, of gum base;
    b) from about 4.9% to about 94.9% by weight of the gum, of erythritol; and
    c) from about 0.1% to about 10%, by weight of the gum, of flavor;
    d) the gum composition containing less than 0.25% of water and ingredients which have an equilibrium moisture content greater than that of xylitol at the same temperature and relative humidity conditions.

12. The chewing gum composition of claim 11, wherein the erythritol is powdered erythritol.

13. A chewing gum composition consisting essentially of:
    a) from about 5% to about 95%, by weight of the gum, of gum base;
    b) from about 4.9% to about 94.9%, by weight of the gum, of erythritol and xylitol; and
    c) from about 0.1% to about 10%, by weight of the gum, of flavor;
    d) the gum composition containing less than 0.25% of water and ingredients which have an equilibrium moisture content of more than about 7% at 20° C. and a relative humidity of 78%.

14. The chewing gum composition of claim 13 wherein the ratio of erythritol to xylitol is between about 9:1 and about 1:9.

15. The chewing gum composition of claim 13 wherein the ratio of erythritol to xylitol is between about 3:1 and about 1:3.

16. The chewing gum composition of claim 13 wherein the ratio of erythritol to xylitol is about 1:1.

* * * * *

UNITED STATES PATENT AND TRADEMARK OFFICE
CERTIFICATE OF CORRECTION

PATENT NO. : 5,397,579
DATED : March 14, 1995
INVENTOR(S) : Robert J. Yatka et al.

It is certified that error appears in the above-identified patent and that said Letters Patent is hereby corrected as shown below:

<u>In the Title Page</u>

In column 2, line 19, after "Steven P. Shurtz", please add --Willian Brinks Hofer Gilson & Lione--.

In column 2, line 58, replace "affects" with --affect--.

Signed and Sealed this

Twentieth Day of June, 2000

Attest:

Q. TODD DICKINSON

*Attesting Officer*  *Director of Patents and Trademarks*